Figure 1:
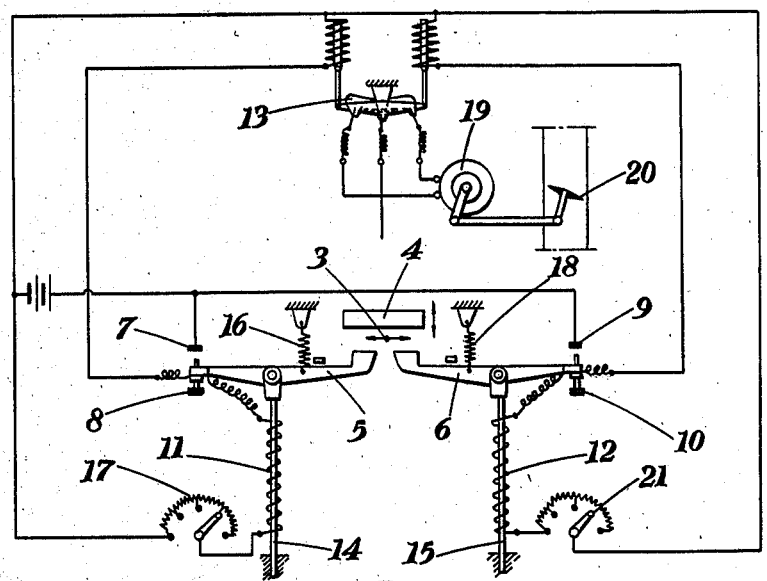

Sept. 22, 1936.    J. H. REINEKE    2,055,087

AUTOMATIC REGULATOR

Filed July 6, 1935

INVENTOR

Josef Heinrich Reineke

BY Emil Bönnelycke

ATTORNEY

Patented Sept. 22, 1936

2,055,087

UNITED STATES PATENT OFFICE 2,055,087

AUTOMATIC REGULATOR

Josef Heinrich Reineke, Bochum, Germany

Application July 6, 1935, Serial No. 30,199
In Germany August 1, 1933

7 Claims. (Cl. 236—70)

Automatic regulators for controlling the pressure in steam pipes and gas pipes are generally comparatively simple by reason of the fact that a change in the adjustment of the valve controlling the pressure produces a practically immediate effect on the pressure. It is much less easy to effect accurate automatic control where the response to the change of adjustment is comparatively slow, as for instance in the case of temperature regulation of a large oven, speed regulation of a compressor, and humidity regulation of the atmosphere of a large room.

It is a common practice to use a pointer which moves automatically in accordance with changes of the temperature, pressure, speed or other condition to be regulated, and is subjected to an intermittent tapping or like action whereby it is caused, when deflected from its normal position, to actuate one or other of two keys for the purpose of restoring the normal condition. The keys may for example be switches controlling a servo-motor, which operates a valve, but my invention is not concerned solely with apparatus in which the keys are electric switches.

It will be clear that in the case of a slow response of the temperature, pressure, speed or other condition to the adjustment effected by operating a key, the pointer, which remains deflected, may strike the key repeatedly and by that means effect "over-correction". The object of my invention is to prevent this and arrange that the adjustment is more or less proportional to the variation from normal of the condition which it is to correct.

For this purpose I connect the keys to means adapted to move the same in the direction of the displacement of the pointer. Preferably, I connect the keys with bimetallic devices which undergo distortion when heated, and arrange that the actuation of a key causes also the heating of the respective bimetallic device, so that by distortion of the latter the key is moved in the direction in which the pointer swings over it when deflected, and is thereby sooner or later removed from the path of the pointer. If the pointer makes a large swing, thereby indicating that a large adjustment is required, the key will be actuated several times before it has, by repeated heatings of the bimetallic device, been removed from the path of the pointer, but if only a short swing has been made a single actuation of the key may suffice to remove the key, that one actuation being sufficient to produce the required adjustment.

It will be understood that I use the term pointer to define broadly a member which moves automatically and proportionally in response to changes in the condition which the regulator is to control.

Figure 2:
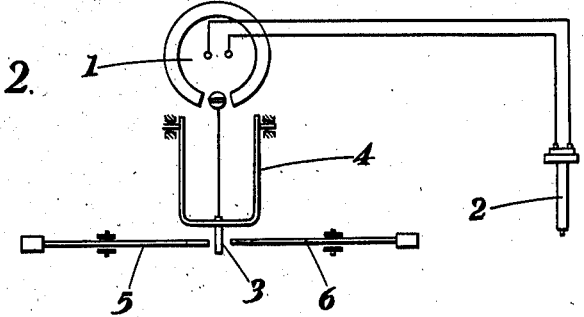
Figure 3:
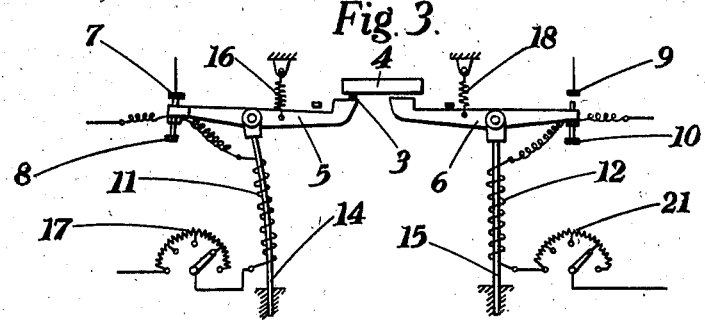

An example is shown diagrammatically in Fig. 1 of the annexed drawing, the regulator being in the case illustrated used for controlling a throttle valve in a steam pipe. Fig. 2 is a plan view of the pointer and key, and Fig. 3 is an elevation showing the two keys and the bimetallic devices.

In the drawing 1 represents a galvanometer, and 2 a thermo-electric cell which is subject to the temperature of the steam passing through the steam pipe and to which the galvanometer is responsive. The pointer 3 of the galvanometer is depressed at short intervals by a pivoted yoke or tapper 4, operating automatically in known manner. Changes of temperature from normal cause the pointer to swing over one or other of two keys 5, 6 so that on depression of the pointer and of the key over which the pointer is disposed, electric contact is made at 7 or 9 to close one or the other of two electric circuits. One of said circuits includes a resistance element 11 associated with or disposed around a bimetallic rod 14 and the other circuit includes a second resistance element 12 associated with or disposed around another bimetallic rod 15. Upon the closure of one or the other of these circuits a relay 13 is operated and causes an electromotor 19 to adjust a throttle valve 20 so as to increase or decrease the supply of heating medium, e. g. fuel, gas or steam. The current passing through the resistance element 11 or 12 also causes flexion of the bimetallic rod 14 or 15 with the result that the key 5 or 6 carried thereby is moved outwards, in the sense of increasing the gap between the keys, as is shown in Fig. 3 with respect to the rod 14 and the key 5. This movement also tends to move the key away from the galvanometer needle, so that the number of successive actuations imparted to the key when the needle has been swung over its face depends on the amplitude of the deflection of the needle. After a certain number of depressions of the deflected needle the key will have been removed from its path. The adjustment of the valve 20 is, therefore, to some extent, proportional to the deflection of the galvanometer needle, which in turn is proportional to the variation of temperature to be corrected. This enables a sensitive electromotor to be used without risk of over-correction. When after causing the requisite valve adjustment to be made the needle swings back to normal position, without striking the key when depressed, the key slowly follows it, by reason of the gradual cooling of the bimetallic rod. The heating of the rods 14 and 15 by the current impulses through the coils can be regulated by means of rheostats 17, 21. This regulates the rate at which the keys return to normal position, but other means may be used for the same purpose, e. g. adjustable heat radiators or regulatable air-cooling devices.

Having thus described my invention what I claim as new therein and desire to secure by Letters Patent is:—

1. An automatic regulator comprising a pointer movable in response to a condition to be controlled, a pair of relatively movable keys having a gap therebetween, said keys being disposed beneath the path of movement of the pointer, means for periodically depressing the pointer to actuate the key disposed therebeneath, means operable by the actuated key to effect an adjustment of the condition to be controlled and means for displacing the actuated key in the direction of movement of the pointer and away from the other key to increase the gap therebetween, thereby minimizing the number of actuations necessary to effect the desired correction.

2. An automatic regulator comprising a pointer movable in response to a condition to be controlled, a pair of relatively movable keys disposed beneath the path of movement of the pointer, each key being supported by a bimetallic element, means for periodically depressing the pointer to actuate the key disposed therebeneath, means operable by the actuated key to effect an adjustment of the condition to be controlled, and means also operable by the actuated key to cause the bimetallic element supporting the actuated key to be distorted and to move such key in the direction of movement of the pointer and away from the other key.

3. An automatic regulator comprising a pointer movable in response to a condition to be controlled, a pair of relatively movable and pivotally mounted keys disposed beneath the path of movement of the pointer, the said keys being arranged to close contacts included in an electric circuit, a relay included in said circuit, means for periodically depressing the pointer to actuate the key disposed therebeneath and to close certain of said contacts, means operable by the relay to effect an adjustment of the condition to be controlled and means for moving the actuated key in the direction of movement of the pointer and away from the other key.

4. An automatic regulator comprising a pointer movable in response to a condition to be controlled, a pair of relatively movable and pivotally mounted keys disposed beneath the path of movement of the pointer, means for periodically depressing the pointer to actuate the key disposed therebeneath, means operable by the actuated key to close one of a pair of electric circuits including a relay, means operable by the relay to effect an adjustment of the condition to be controlled and means for moving the actuated key in the direction of movement of the pointer and away from the other key.

5. An automatic regulator comprising a pointer movable in response to a condition to be controlled, a pair of relatively movable and pivotally mounted keys disposed beneath the path of movement of the pointer, means for periodically depressing the pointer to actuate the key disposed thereBeneath, means operable by the actuated key to close one of a pair of electric circuits including a relay, means operable by the relay to effect an adjustment of the condition to be controlled, bimetallic elements associated with said keys and means operable, upon the closing of one of said circuits, to cause a distortion of the element associated with the actuated key whereby the latter is moved in the direction of movement of the pointer and away from the other key.

6. An automatic regulator comprising a pointer movable in response to a condition to be controlled, a pair of relatively movable keys disposed beneath the path of movement of the pointer, each key being supported by a bimetallic element, means for periodically depressing the pointer to actuate the key disposed therebeneath, means operable by the actuated key to effect an adjustment of the condition to be controlled, an electric resistance associated with each bimetallic element, and means brought into operation by the actuated key to cause its bimetallic element to be heated by the resistance associated therewith and to displace the actuated key in the direction of movement of the pointer and away from the other key.

7. An automatic regulator comprising a pointer movable in response to a condition to be controlled, a pair of relatively movable keys having a gap therebetween, said keys being disposed beneath the path of movement of the pointer, means for displacing either key longitudinally while leaving the other key stationary, means for depressing the key over which the pointer is disposed, means operated by the depressed key to effect an adjustment of the condition to be controlled, and means also operable by the depressed key to displace that key endwise in the direction of movement of the pointer and away from the other key, thereby minimizing the number of successive actuations of a key necessary to effect a desired correction.

JOSEF HEINRICH REINEKE.